(12) United States Patent
Cao et al.

(10) Patent No.: US 11,793,617 B2
(45) Date of Patent: Oct. 24, 2023

(54) ORAL SUCTION DEVICE

(71) Applicant: CAO Group, Inc., West Jordan, UT (US)

(72) Inventors: Densen B. Cao, Sandy, UT (US); Jack Nichols, American Fork, UT (US)

(73) Assignee: CAO Group, Inc., West Jordan, UT (US)

( * ) Notice: Subject to any disclaimer, the term of this patent is extended or adjusted under 35 U.S.C. 154(b) by 0 days.

(21) Appl. No.: 17/804,785

(22) Filed: May 31, 2022

(65) Prior Publication Data

US 2022/0378563 A1 Dec. 1, 2022

Related U.S. Application Data

(60) Provisional application No. 63/195,167, filed on May 31, 2021.

(51) Int. Cl.
*A61C 17/10* (2006.01)
*A61C 17/06* (2006.01)

(52) U.S. Cl.
CPC ............ *A61C 17/10* (2019.05); *A61C 17/084* (2019.05)

(58) Field of Classification Search
CPC .............................. A61C 17/10; A61C 17/084
USPC ........................................................ 433/93
See application file for complete search history.

(56) References Cited

U.S. PATENT DOCUMENTS

| 4,259,067 | A * | 3/1981 | Nelson | A61C 17/08 |
| | | | | 433/93 |
| 4,261,697 | A * | 4/1981 | Newitter | A61C 5/82 |
| | | | | 433/137 |
| 2009/0035718 | A1 * | 2/2009 | Coffee | A61C 17/10 |
| | | | | 433/93 |
| 2010/0119989 | A1 * | 5/2010 | Raybuck | A61C 5/90 |
| | | | | 264/16 |
| 2011/0229847 | A1 * | 9/2011 | Worthington | A61C 17/08 |
| | | | | 433/93 |
| 2014/0162209 | A1 * | 6/2014 | Nguyen | A61C 17/0208 |
| | | | | 433/93 |
| 2014/0248580 | A1 * | 9/2014 | Hirsch | A61C 5/90 |
| | | | | 433/93 |
| 2018/0125349 | A1 * | 5/2018 | Lutz | A61B 1/0684 |
| 2021/0068922 | A1 * | 3/2021 | Nisi | A61N 5/1014 |
| 2021/0378804 | A1 * | 12/2021 | Renne | A61B 1/24 |
| 2022/0087801 | A1 * | 3/2022 | DiMarino | A61C 17/12 |

FOREIGN PATENT DOCUMENTS

| KR | 20200039063 A | * | 10/2018 | |
| WO | WO-2011103543 A1 | * | 8/2011 | ......... A61B 1/00154 |
| WO | WO-2018068901 A1 | * | 4/2018 | ............. A61C 17/08 |

* cited by examiner

*Primary Examiner* — Matthew M Nelson
(74) *Attorney, Agent, or Firm* — Dobbin IP Law, P.C.; Geoffrey E. Dobbin

(57) ABSTRACT

An oral suction device provides an oral suction screen over the oral cavity of a patient by providing upper and lower suction wings attached to a manifold. The wings are inserted between the upper and lower lips and arches of a patient, respectively, and serve to capture aerosols which would otherwise be ejected from the oral cavity. A tongue/cheek retractor, also in pneumatic communication with the manifold, serves to extract saliva and other products from the oral cavity while also preventing the tongue and cheeks from ingress of the workspace for the dental procedure.

2 Claims, 4 Drawing Sheets

ORAL SUCTION DEVICE

CROSS-REFERENCES TO RELATED APPLICATIONS

The present invention claims priority to U.S. Application No. 63/195,167, filed on May 31, 2021, and incorporates the same by reference herein in its entirety.

FIELD OF THE INVENTION

The present invention relates to the field of dentistry and more particularly relates to a suction device for use during procedures.

BACKGROUND OF THE INVENTION

Suction is an essential tool in dental procedures to remove saliva, water, and aerosol from an oral cavity during dental treatment. Most dental procedures require the oral cavity to be relatively dry. As such, the removal of saliva and water has been a long-standing necessity. Additionally, aerosol that is generated from dental procedures contains bacteria and viruses from the treated patient and can lead to the infection of practitioners. Therefore, it is important that any aerosols created during a dental procedure be controlled before they can infect the practitioner or cross-contaminate the surrounding area. Suction also is necessary to remove substances used during dental procedures which if ingested by a patient could cause concern. Efficient removal of saliva tends to also remove these substances. Many suction devices have been used in dentistry. However, none of them can effectively remove the spatter and aerosol generated from dental procedures. Spatter and aerosol from dental procedures travel at very high speed. The travel pattern of spatter and aerosol needs to be altered in order to catch such spatter and aerosol before they exit the oral cavity.

Other concerns in oral procedures include securing adequate space for the practitioner to execute a procedure and also providing adequate illumination for the practitioner in the workspace. Solutions have been devised to provide not only suction, but also retainers for the tongue and cheeks, bite blocks to help the patient keep their mouth open, and fiber optic illumination means so that a practitioner can properly view the workspace. However, these solutions do not address aerosols and spatter. As recent events have shown, the capture of aerosols created from a human body is of tantamount importance to lessen the spread of infectious agents from that human body. Therefore, what is needed is a device that will not only provide adequate space for operation and suction of saliva and water, but also suction and control of created aerosols. Ideally, illumination can also be added.

The present invention is an oral suction device that not only provides retraction of surrounding tissues and a bite block, but also isolates the oral cavity so that aerosols created during a dental procedure will not exit said oral cavity. The present invention represents a departure from the prior art in that the oral suction device of the present invention allows for control of aerosols as well as providing a more ideal workspace for dental procedures.

SUMMARY OF THE INVENTION

In view of the foregoing disadvantages inherent in the known types of dental workspace aids, an improved oral suction otherwise may provide a workspace structure that meets the following objectives: that it be inexpensive to manufacture and easy to operate, that it effectively controls saliva and water found in oral cavity, that it will retain cheeks and the tongue so they do not invade a desired workspace, and that it will provide a section curtain across the mouth so as to prevent aerosols and spatter from escaping the oral cavity while not interfering with a practitioners access to said oral cavity. An additional objective may be to provide illumination to the workspace. As such, a new and improved oral suction device may comprise a vacuum source connected to a manifold with and integrated bite block, a tongue and cheek retractor in pneumatic communication with the manifold, and two section curtain wings also in pneumatic communication with the manifold to accomplish these objectives. Fiber optic or LED light sources may also be mounted on the manifold.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In order to describe the manner in which the above-recited and other advantages and features of the invention can be obtained, a more particular description of the invention briefly described above will be rendered by reference to specific example embodiments thereof which are illustrated in the appended drawings. Understanding that these drawings depict only typical embodiments of the invention and are therefore not to be considered as limiting of its scope, the invention will be described and explained with additional specificity and detail using the accompanying drawings.

DETAILED DESCRIPTION OF THE PREFERRED EMBODIMENT

Figure 1:
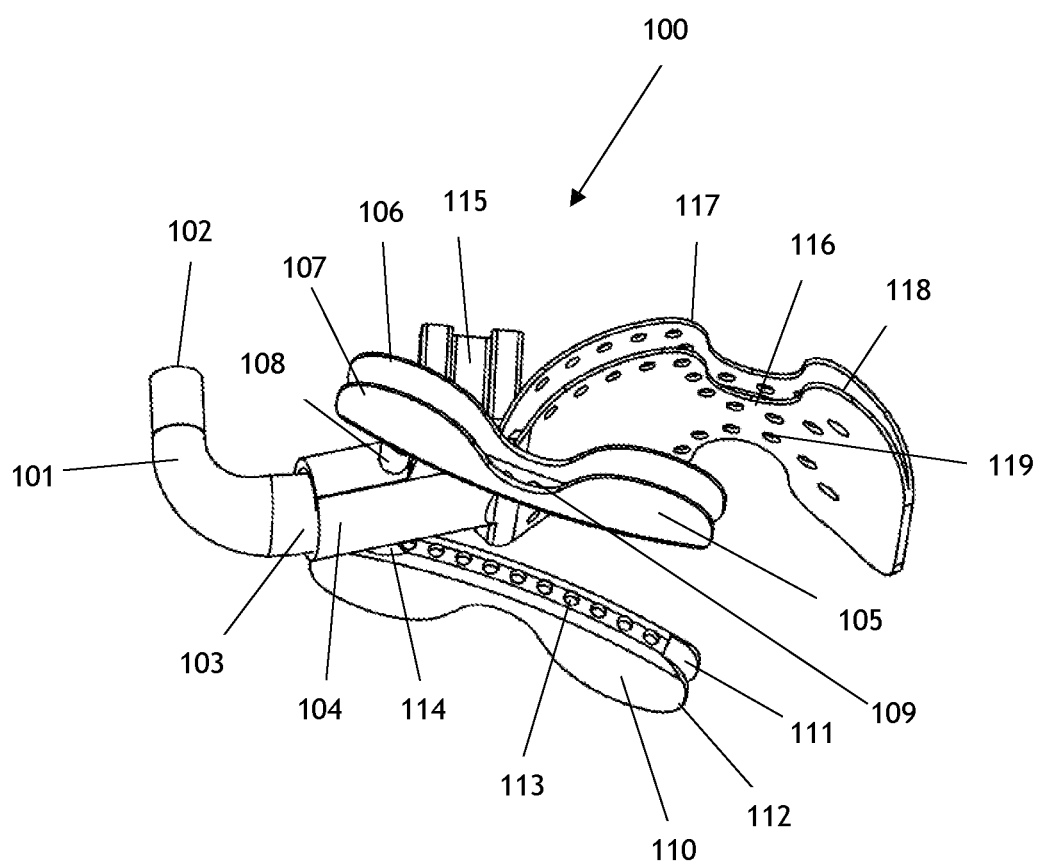
FIG. 1 is a perspective view of one embodiment of an oral suction device.
Figure 2:
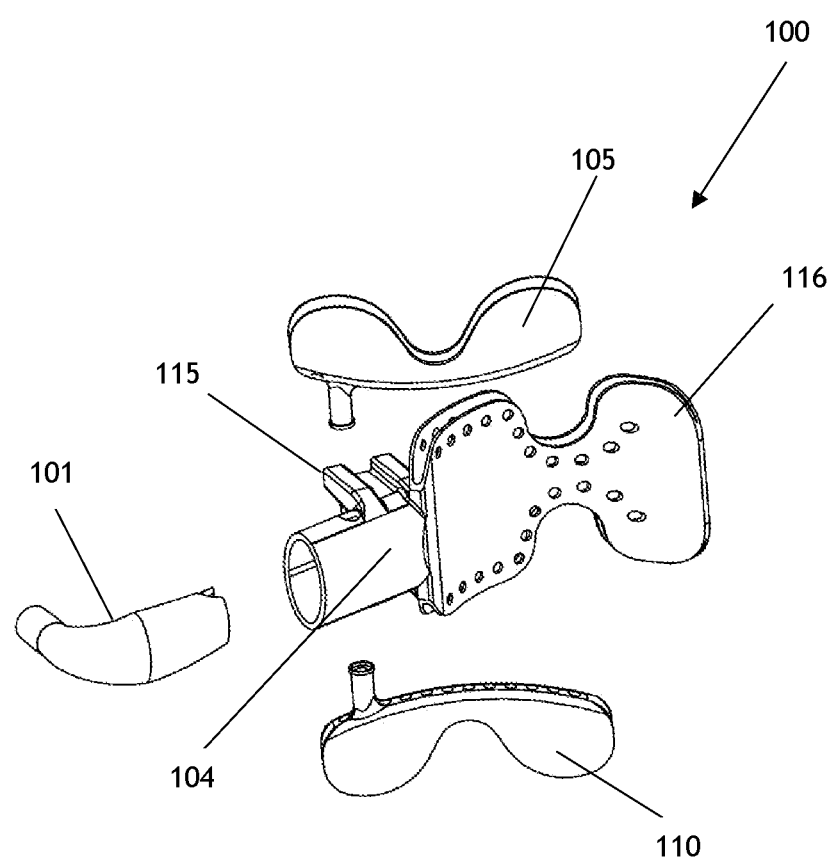
FIG. 2 is an exploded view of the oral suction device of FIG. 1.
Figure 3:
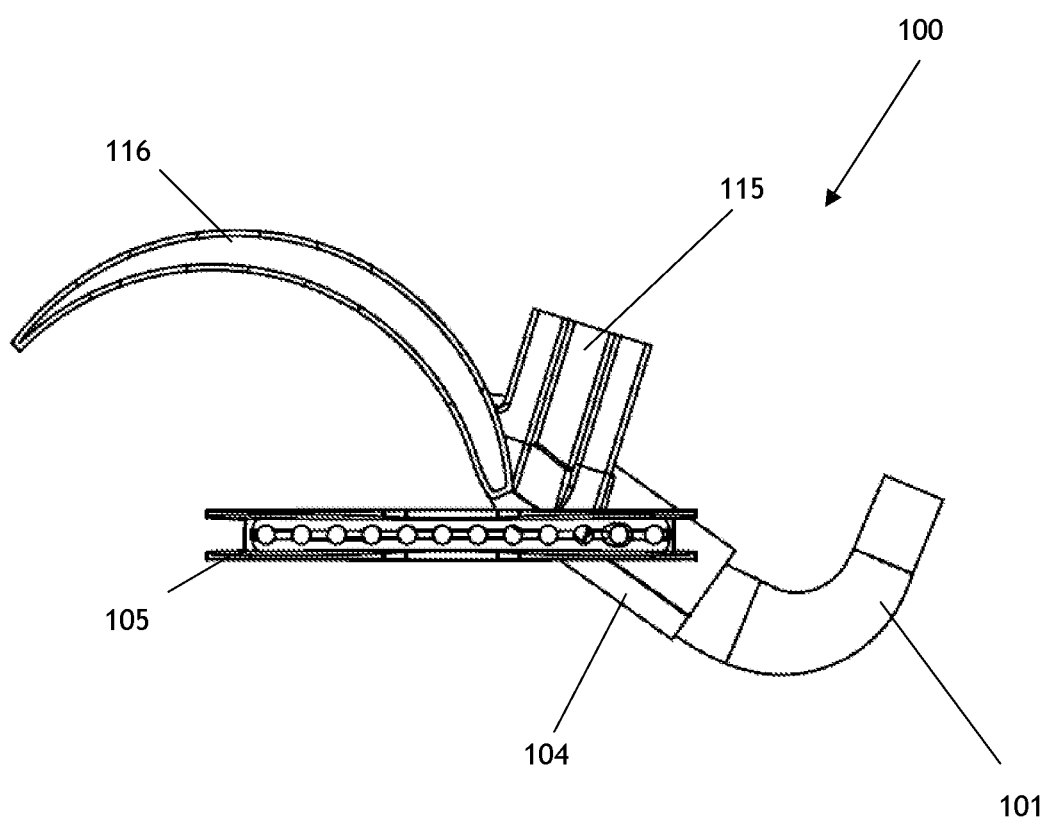
FIG. 3 is a top plan view of the oral suction device of FIG. 1.
Figure 4:
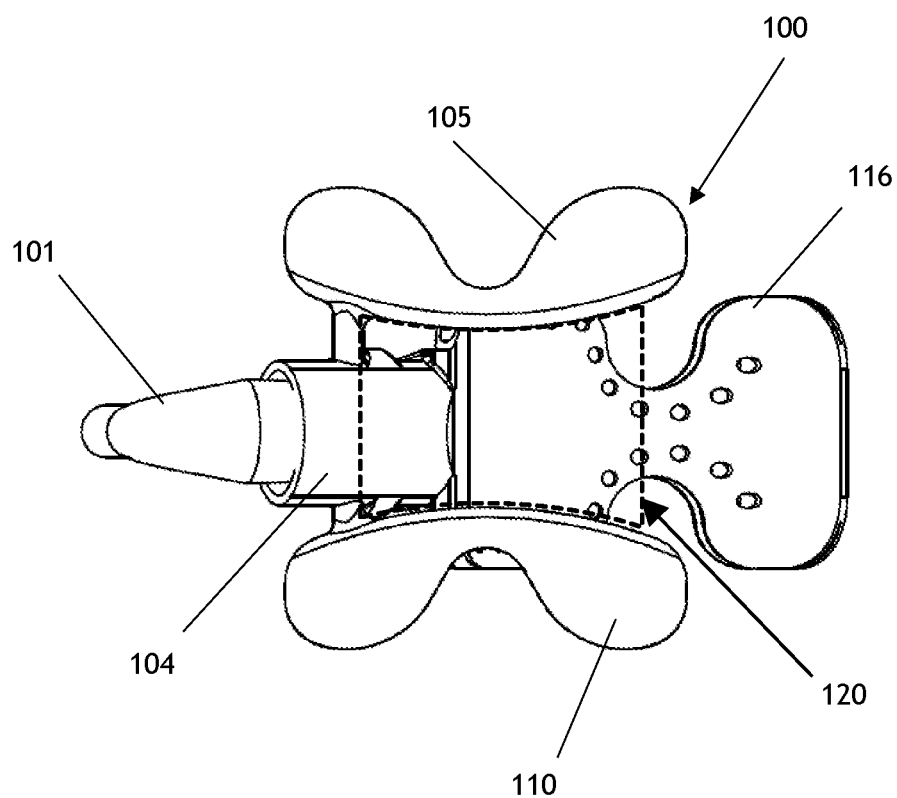
FIG. 4 is a side elevation of the oral suction device of FIG. 1.

With reference now to the drawings, a preferred embodiment of the oral suction device is herein described. It should be noted that the articles "a", "an", and "the", as used in this specification, include plural referents unless the content clearly dictates otherwise.

With reference to the figures, in the device 100, there is a connector piece 101 with one end 102 connected to high volume evacuation (HVE) source and the other end 103 to connect to a manifold 104 which interconnects other pieces that are placed oral cavity. The connector piece 101 is hollow inside and be made of plastics, silicon, rubber, and other materials. The connector piece 101 can also contain batteries and LED light sources to illuminate the oral cavity and treated site. The manifold 104 is also hollow inside to provide a suction channel with the interior of the connector piece 101. The first component connected to manifold 104 is upper suction wing 105, which includes two lips 106 and 107, parallel to each other, and a bottom piece 109 which including holes as suction inlets. There is a hollow connector post 108 connects upper suction wing to manifold 104 and maintain pneumatic communication with the suction channel. The second piece connected to 104 is lower suction wing 110, which is like the upper suction wing 105, including two parallel lips 111 and 112, a bottom piece 113 which includes holes as suction inlet, and a corresponding hollow connector post 114 to connect with manifold 104. The third piece connected to manifold 104 is a biting block piece 115, angling away from the suction wings 105, 110 and having upper and lower troughs for a patient to bite on it. The fourth piece connected to manifold 104 is tongue/cheek isolation structure 116 which has two side walls 117 and 118, arranged in parallel. There are ports in pneumatic communication with the manifold 104 in both side walls 117 and 118 to serve as suction inlets.

In operation, the device 100 is connected to a HVE source through connector piece 101. A patient's upper and lower teeth are positioned onto the biting block 115 and the upper 105 and lower 110 suction wings are positioned between upper inner lip and upper tooth arch, and between the lower inner lip and lower tooth arch respectively. The tongue/cheek isolation structure 116 is then folded between tongue and treated teeth area to push tongue away from treated teeth area. The isolation structure 116 may also rest against the cheek, proximate the workspace, to prevent its ingress. During the procedures, the suction source will create a vacuum that draws ambient air through the ports in the side walls 117, 118. This suction creates a zone about the oral cavity that may be defined as a "suction curtain" 120 where spatter, aerosol, waters, and other residues are drawn with the suction through the ports in the upper suction wing 105, lower suction wing 110, and tongue/cheek isolation structure 116 as said residues pass into the region defined by the suction curtain 120.

Although the present invention has been described with reference to preferred embodiments, numerous modifications and variations can be made and still the result will come within the scope of the invention. The described embodiments are to be considered in all respects only as illustrative and not restrictive. No limitation with respect to the specific embodiments disclosed herein is intended or should be inferred. Therefore, the scope of the invention is indicated by the appended claims rather than by the foregoing description. All changes which come within the meaning and range of equivalency of the claims are to be embraced within their scope.

What is claimed is:
1. An oral suction device comprising:
   a. a central manifold in pneumatic communication with a vacuum source;
   b. a tongue retractor flap having suction ports, said suction ports in the tongue retractor flap in pneumatic communication with the central manifold;
   c. a pair of parallel suction wings, mounted upon the central manifold, said parallel suction wings having a plurality of suction ports in pneumatic communication with the central manifold; and,
   d. a bite block mounted upon the central manifold;
   wherein the parallel suction wings and the suction ports thereon define a suction curtain positioned proximate an oral cavity when in use.
2. The oral suction device of claim 1, further comprising an illumination source.

* * * * *